(12) United States Patent
Hart (10) Patent No.: US 10,462,666 B2
(45) Date of Patent: Oct. 29, 2019

(54) METHOD OF COMMUNICATING AND AUTHENTICATING CREDENTIALS BETWEEN A PORTABLE COMPUTING DEVICE AND MULTIPLE RADIO FREQUENCY IDENTIFICATION ENABLED READERS

(71) Applicant: Jason Dean Hart, Fremont, CA (US)

(72) Inventor: Jason Dean Hart, Fremont, CA (US)

( * ) Notice: Subject to any disclaimer, the term of this patent is extended or adjusted under 35 U.S.C. 154(b) by 263 days.

(21) Appl. No.: 15/682,539

(22) Filed: Aug. 21, 2017

(65) Prior Publication Data

US 2018/0054735 A1 Feb. 22, 2018

Related U.S. Application Data

(60) Provisional application No. 62/377,339, filed on Aug. 19, 2016.

(51) Int. Cl.
| | |
|---|---|
| *H04W 12/06* | (2009.01) |
| *G06K 7/10* | (2006.01) |
| *H04L 29/06* | (2006.01) |
| *G07C 9/00* | (2006.01) |
| *H04W 4/80* | (2018.01) |

(52) U.S. Cl.
CPC ........ *H04W 12/06* (2013.01); *G06K 7/10366* (2013.01); *G07C 9/00* (2013.01); *G07C 9/00103* (2013.01); *H04L 63/0492* (2013.01); *H04L 63/08* (2013.01); *H04W 4/80* (2018.02)

(58) Field of Classification Search
CPC ......... G06K 7/10366; G06K 19/07749; G07C 9/00; G07C 9/00103; H04W 12/06; H04W 4/80
See application file for complete search history.

(56) References Cited

U.S. PATENT DOCUMENTS

| | | | | |
|---|---|---|---|---|
| 7,019,639 | B2* | 3/2006 | Stilp | G08B 19/005 340/531 |
| 7,456,743 | B2* | 11/2008 | Malacarne | G06K 7/0008 235/385 |

(Continued)

OTHER PUBLICATIONS

Wikipedia article on Radio-Frequency Identification, Table of Frequencies (Wayback Machine dated to Jun. 2, 2016).*

*Primary Examiner* — Sharon S Lynch (57) ABSTRACT

A method of communicating and authenticating credentials between a portable computing device and multiple radio frequency identification (RFID) enabled readers requires a portable computing device, a RFID reader, and user credentials. The portable computing devices stores user credentials unique to the portable computing device and the RFID reader. The RFID reader activates a corresponding building access system. The method begins by inductively harvesting electrical power into the portable computing device from the RFID reader, if the portable computing device is proximal to the RFID reader. The method then sends the user credentials from a radio communication module of the portable computing device to a radio communication module of the RFID reader, if the electrical power is inductively harvested from the RFID reader into the portable computing device. An authentication process is then executed for the set of user credentials with the RFID reader.

9 Claims, 12 Drawing Sheets

(56) References Cited

U.S. PATENT DOCUMENTS

| | | | | |
|---|---|---|---|---|
| 7,597,250 B2* | 10/2009 | Finn | | B60R 25/25 235/375 |
| 8,280,304 B2* | 10/2012 | Hirsch | | H04L 63/18 455/41.1 |
| 8,410,899 B2* | 4/2013 | Stevenson | | A61N 1/08 340/5.61 |
| 8,880,055 B1* | 11/2014 | Clement | | G06Q 20/3278 455/410 |
| 9,087,246 B1* | 7/2015 | Chin | | G06K 7/10297 |
| 9,690,272 B2* | 6/2017 | Chin | | G05B 15/02 |
| 9,959,440 B2* | 5/2018 | Chau | | H04B 5/0062 |
| 10,164,687 B2* | 12/2018 | Jang | | G06F 21/44 |
| 10,229,407 B2* | 3/2019 | Hart | | G06Q 20/3278 |
| 2005/0105734 A1* | 5/2005 | Buer | | G07C 9/00007 380/270 |
| 2006/0219776 A1* | 10/2006 | Finn | | B60R 25/25 235/380 |
| 2007/0132584 A1* | 6/2007 | Malacarne | | G06K 7/0008 340/572.1 |
| 2007/0202807 A1* | 8/2007 | Kim | | H04B 5/0062 455/41.2 |
| 2012/0007712 A1* | 1/2012 | Tung | | B60R 25/243 340/5.72 |
| 2012/0019379 A1* | 1/2012 | Ben Ayed | | G08B 13/1436 340/539.1 |
| 2015/0242663 A1* | 8/2015 | Babu | | G06F 1/3215 235/380 |
| 2016/0015004 A1* | 1/2016 | Bonge, Jr. | | A01K 27/009 119/718 |
| 2016/0142210 A1* | 5/2016 | Hoyer | | H04L 9/3268 380/270 |
| 2016/0241999 A1* | 8/2016 | Chin | | H04W 4/021 |
| 2017/0364905 A1* | 12/2017 | Hart | | G06Q 20/3278 |
| 2018/0075722 A1* | 3/2018 | Parma | | G08B 13/2474 |

* cited by examiner

METHOD OF COMMUNICATING AND AUTHENTICATING CREDENTIALS BETWEEN A PORTABLE COMPUTING DEVICE AND MULTIPLE RADIO FREQUENCY IDENTIFICATION ENABLED READERS

The current application claims priority to U.S. provisional application Ser. No. 62/377,339 filed on Aug. 19, 2016. The current application is filed on Aug. 21, 2017 while Aug. 19, 2017 was on a weekend.

FIELD OF THE INVENTION

The present invention generally relates to the communication between portable computing devices and multiple radio frequency identification (RFID) enabled readers. More specifically, the present invention allows a user to communicate and authenticate credentials between a portable computing device and at least one RFID enabled reader.

BACKGROUND OF THE INVENTION

Bluetooth and other radio electronic keys has existed for many years and provided a convenient way to communicate identity at medium ranges, such as one hundred feet. However, Bluetooth and similar radio technology requires a power source, requiring the replacement and disposing of batteries or the replacement of the entire Bluetooth unit once the power cells are depleted.

Conversely, in passive radio frequency identification (RFID) based keys, a device is positioned within a close range in order for a user to be identified by an RFID reader. In these systems, the RFID credential is a passive device, meaning that the passive device does not contain its own power source, generally, and the passive device inducts power using magnetic coupling from the RFID reader. This presents an advantage that allows RFID credentials to last for many years without needing an internal power source. The disadvantage of RFID based keys, however, is the relative close proximity needed to that of the RFID reader in order for the RFID based keys to receive induced power.

Furthermore, because RFID readers generally deliver small amounts of intermittent power, typically 2-4 Milliamps (mA) in practice, within a close proximity, RFID based keys are unsuitable for long range communication or communication that may require intensive computing power. RFID reader data communication is typically slow being limited to the industry frequencies of 125 kilohertz (kHz) or 13.56 Megahertz (MHz) ranges. These frequencies allow data rates from 1000 bits per second to 900,000 bits per second in optimal conditions. The data rates depend greatly on how the RFID based key is positioned, the magnetic influences of the surrounding environment, the temperature, the humidity, the human usage, the condition of the device antenna and on. These factors make RFID based keys a poor choice for data intensive applications.

Most organizations have deployed some form of RFID based building access system to serve as a replacement or to augment physical keys and locks. These RFID systems have become insecure with simple card cloning. These RFID systems have become inconvenient with the shift into smartphone culture. However, the cost to replace or upgrade RFID systems in order to provide greater security is so great that organizations continue using the existing RFID based building access system. A replacement or upgrade of a single door costs upwards of one thousand dollars. Replacing 125 kHz RFID card with a more secure 13.56 MHz RFID card does not eliminate the inconvenience of carrying an RFID card along with a smartphone, nor in many cases does the RFID card improve the security.

Practically, the transition of using traditional physical access control RFID cards to mobile devices cannot happen all at once. Organizations will have to opt for a mixed system of RFID and smartphones or smart devices. Consequently, traditional RFID readers will most likely remain in use for a period of time.

The present invention uses Bluetooth communication to communicate with a Bluetooth enabled door reader in order to send and receive credential information about a user. The credential information is then used by the physical access control system to determine if the door in proximity to the RFID reader is accessible by the user. The portable computing device of the present invention receives power by harvesting the RFID field of the RFID reader already installed on the physical access control system, thereby not needing a large power storage device. This process enables the deployment of Bluetooth door readers or upgrades to existing RFID readers throughout a building with systems that communicate over Bluetooth. Power harvesting of RFID fields can now occur at greater distances as well as Bluetooth communication. The portable computing device advantageously leverages power harvesting at greater distances than RFID communication and is able to communicate over Bluetooth frequencies. This provides a better experience to the user who can identify himself or herself with the portable computing device at longer distances without having to replace batteries as that of existing devices that utilize portable Bluetooth systems.

Furthermore, the introduction of Bluetooth in these physical credentials provides a logical bridge with mobile device credentials by allowing a mobile device which contains an NFC reader to power the invention and allow the communication over Bluetooth to the invention for the transfer of information such as the updating of access credentials and encryption information.

DETAIL DESCRIPTIONS OF THE INVENTION

All illustrations of the drawings are for the purpose of describing selected versions of the present invention and are not intended to limit the scope of the present invention.

Figure 1:
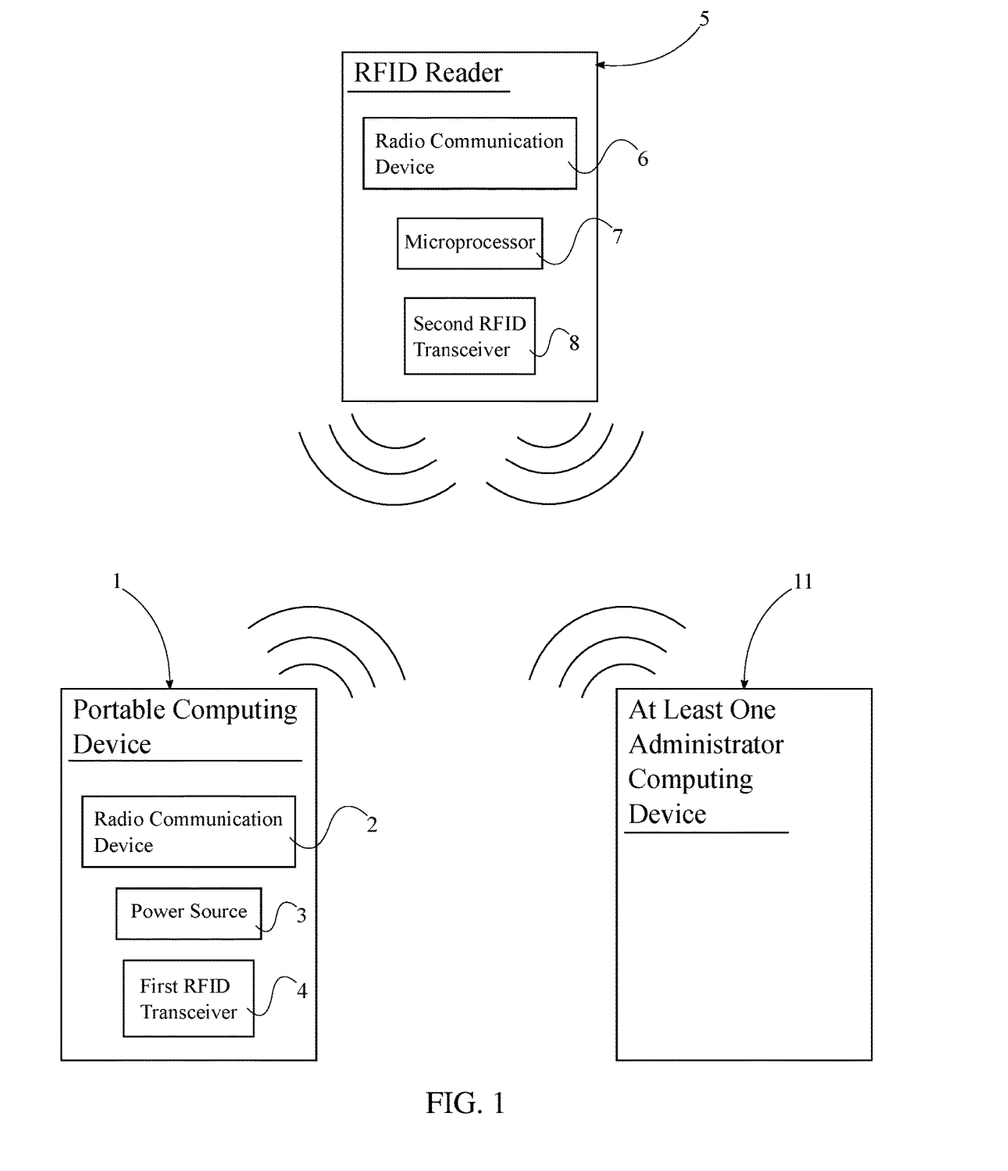
FIG. 1 is a schematic view for the system of the present invention, wherein the RFID reader is able to communicate with the portable computing device and the at least one administrator computing device.
Figure 5:
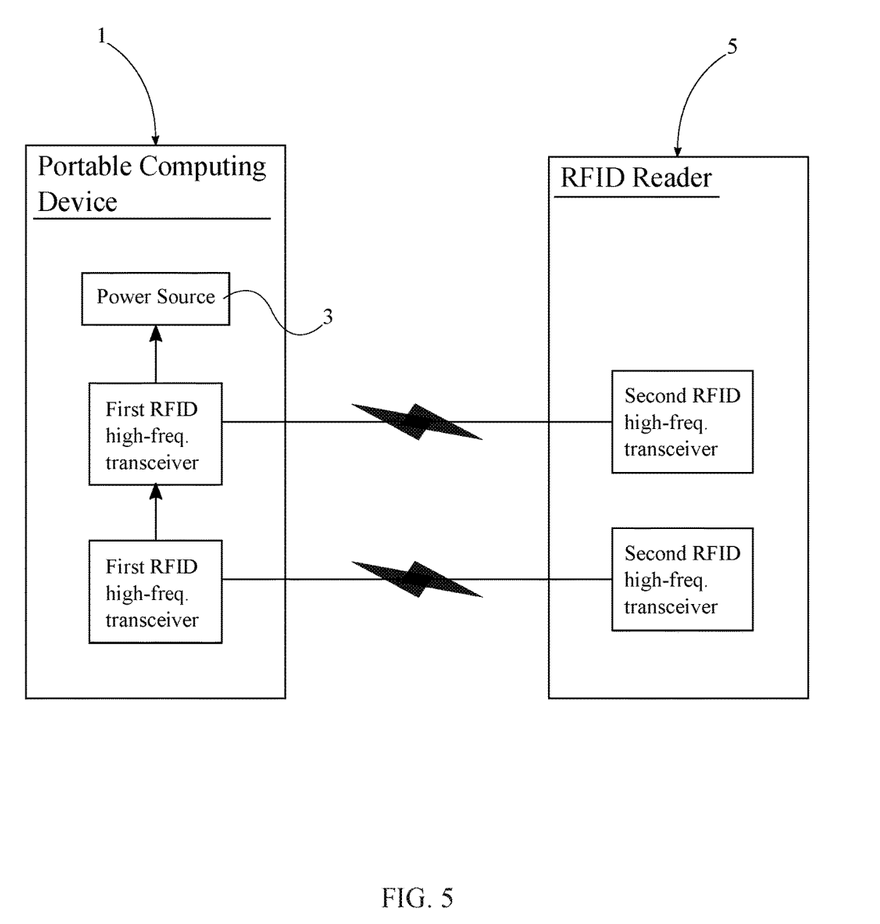
FIG. 5 is a schematic view for the system of the present invention, wherein the first high-frequency RFID transceiver and the second high-frequency RFID transceiver are inductively coupled to each other, and wherein the first low-frequency RFID transceiver and the second low-frequency RFID transceiver are simultaneously and inductively coupled to each other.

The present invention is a method of communicating and authenticating credentials between a portable computing device 1 and multiple radio frequency identification (RFID) enabled readers. The present invention facilitates the use of portable computing device 1 such as RFID key fobs and RFID key cards in environments that do not allow mobile phones or comparable smart devices. Thus, as seen in FIG. 1 and FIG. 5, the physical system used to implement the method of the present invention includes a portable computing device 1 (Step A) and a RFID reader 5 (Step B), wherein a set of user credentials is stored on the portable computing device 1 (Step C). The portable computing device 1 communicates with a nearby RFID reader 5 and provides the set of user credentials to the RFID reader 5. The RFID reader 5 provides the necessary power to the portable computing device 1 and verifies the set of user credentials. The RFID reader 5 activates a corresponding door mechanism, allowing a user to access a restricted area. The door mechanism may be that of a traditional building, a garage, a gate, or a variety of other long-range entry points. The set of user credentials corresponds to one or more RFID readers 5 and allows the user to access restricted areas. Furthermore, the portable computing device 1 includes a radio communication module 2 and a power source 3 (Step A). The RFID reader 5 also includes a radio communication module 6 and a microprocessor 7 (Step B). The radio communication module 2 of the portable computing device 1 facilitates the delivery of user credentials from the portable computing device 1 to the RFID reader 5. The RFID reader 5 or a secondary Bluetooth reader in range receives the user credentials via the radio communication module 6 of the RFID reader 5 or Bluetooth reader. The power source 3 of the portable computing device 1 harnesses and stores power from a magnetic field generated by the RFID reader 5. The power source 3 adjusts for fluctuations in the magnetic field. The microprocessor 7 of the RFID reader 5 or separate Bluetooth reader verifies the set of user credentials of the portable computing device 1.

The portable computing device 1 of the present invention communicates on the Bluetooth frequencies while harvesting its power from the magnetic field of an RFID reader, which may not be supported on the vast majority of RFID readers. Therefore, a secondary device, which communicates on Bluetooth, is in proximity to the original RFID reader 5. This may be in the form of an upgrade to the traditional RFID reader 5 or a separate standalone Bluetooth reading device.

Figure 6:
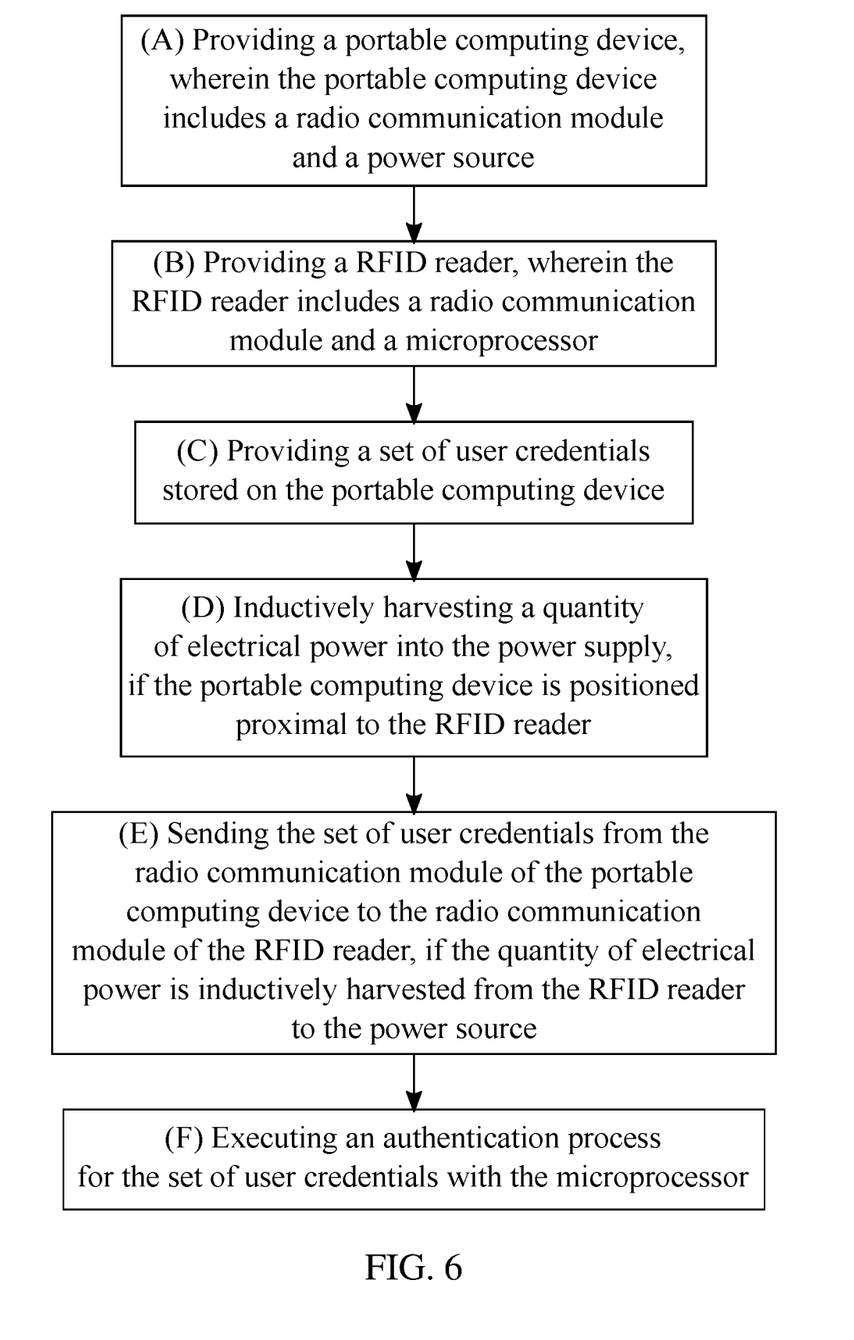
FIG. 6 is a flowchart illustrating the overall process for the present invention.

The overall process for the present invention includes the following steps that are implemented with the portable computing device 1, the RFID reader 5, and the set of user credentials that are stored on the portable computing device 1. As shown in FIG. 6, the overall process begins with inductively harvesting a quantity of electrical power into the power source 3, if the portable computing device 1 is positioned proximal to the RFID reader 5 (Step D). The portable computing device 1 may be positioned proximal to the RFID reader 5 so that the portable computing device 1 is able to communicate using Bluetooth with the RFID reader 5 or a separate Bluetooth reader. In order for the set of user credentials stored on the portable computing device 1 to be verified by the RFID reader 5, the set of user credentials is sent from the radio communication module 2 of the portable computing device 1 to the radio communication module 6 of the RFID reader 5, only if the quantity of electrical power is inductively harvested from the RFID reader 5 to the power source 3 (Step E). The quantity of electrical power inductively harvested from the RFID reader 5 allows the portable computing device 1 to communicate with the RFID reader 5 without requiring a replaceable power supply. Upon the delivery of user credentials, an authentication process is executed for the set of user credentials with the microprocessor 7 (Step F). The authentication process validates or denies the user access into a corresponding restricted area, Consequently, the microprocessor 7 of the RFID reader 5 activates a corresponding door mechanism depending on the validation of the set of user credentials.

Figure 4:
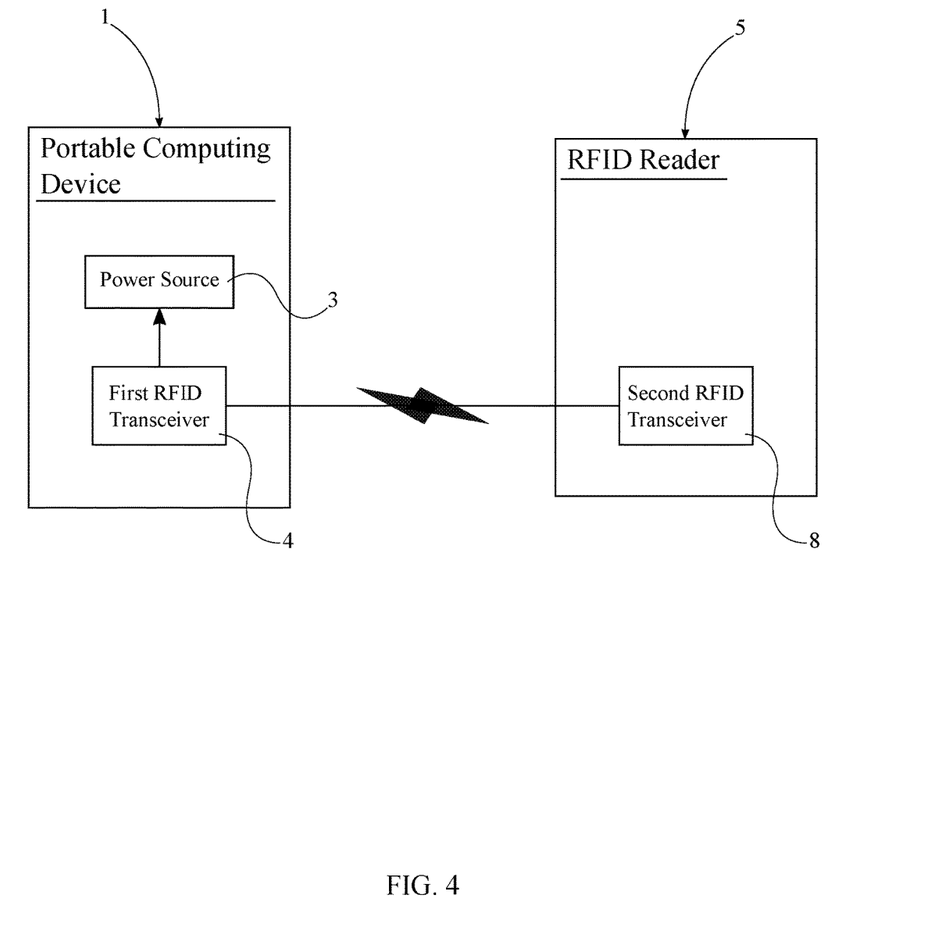
FIG. 4 is a schematic view for the system of the present invention, wherein the first RFID transceiver and the second RFID transceiver are inductively coupled to each other.
Figure 7:
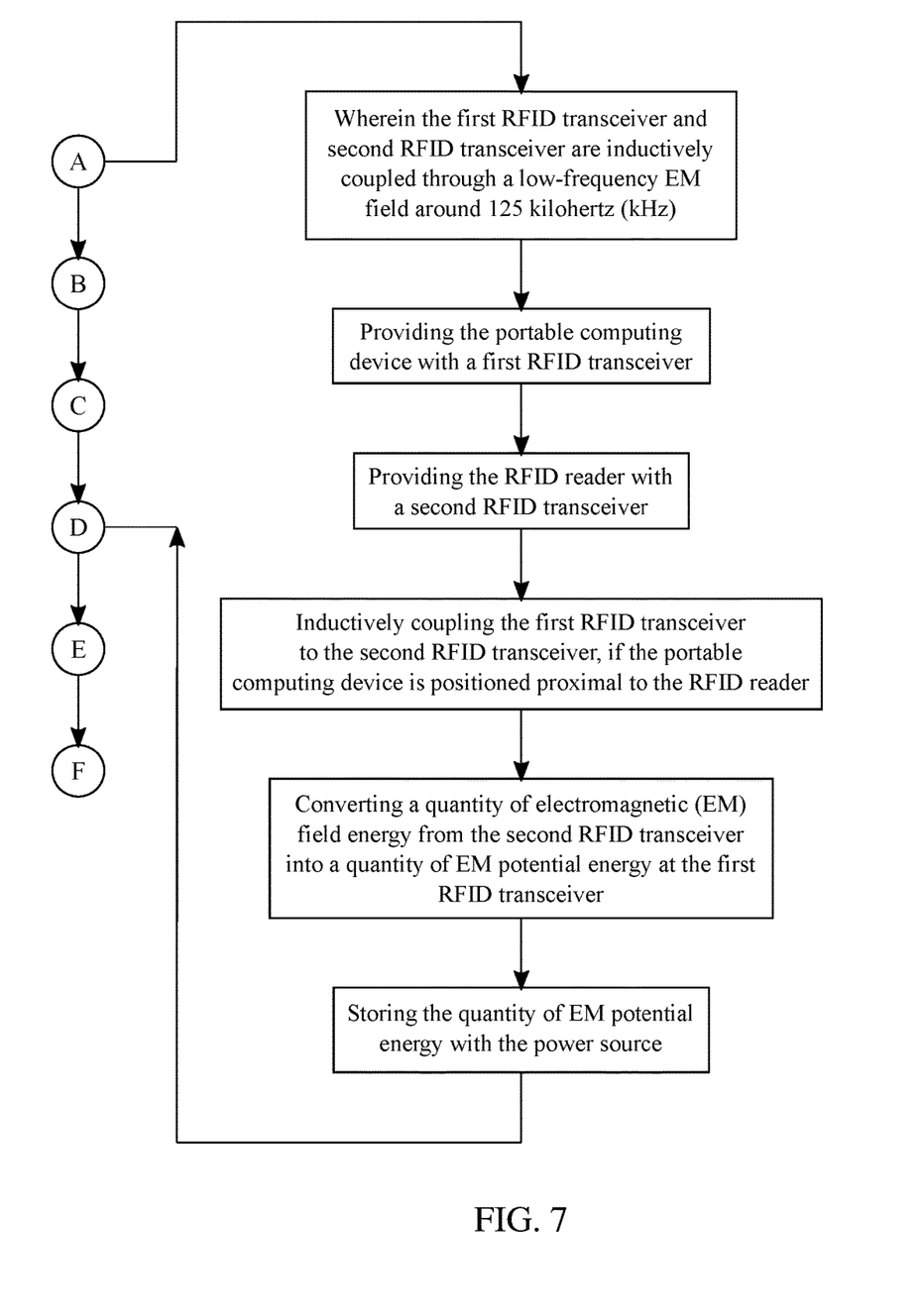
FIG. 7 is a flowchart illustrating the process of storing the quantity of electromagnetic (EM) potential energy with the power source for the present invention, when the first RFID transceiver and the second RFID transceiver are inductively coupled through a low-frequency EM field.
Figure 8:
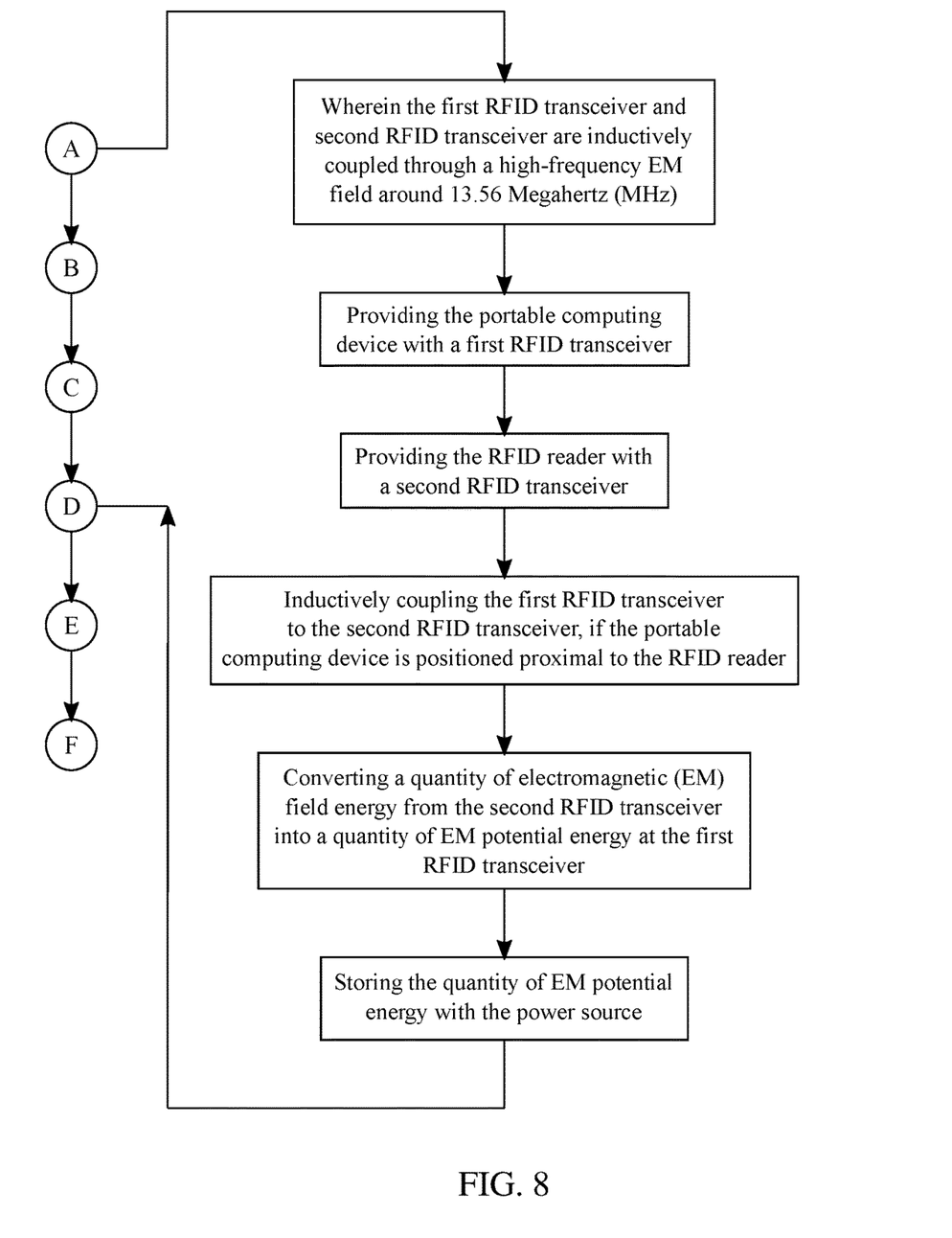
FIG. 8 is a flowchart illustrating the process of storing the quantity of EM potential energy with the power source for the present invention, when the first RFID transceiver and the second RFID transceiver are inductively coupled through a high-frequency EM field.

In order for the power source 3 of the portable computing device 1 to harness power from these RFID readers 5, the portable computing device 1 may further include a first RFID transceiver 4, and the RFID reader 5 further includes a second RFID transceiver 8, which are shown in FIG. 4. The first RFID transceiver 4 inductively couples to the second RFID transceiver 8, if the portable computing device 1 is positioned proximal to the RFID reader 5, as shown in FIGS. 7 and 8. This allows the portable computing device 1 to communicate with a specific, proximal RFID reader 5 and activate a desired door mechanism. A quantity of electromagnetic (EM) field energy from the second RFID transceiver 8 is converted into a quantity of EM potential energy at the first RFID transceiver 4. The conversion allows the portable computing device 1 to harness power from the RFID reader 5. The quantity of EM potential energy is stored with the power source 3 so that the portable computing device 1 may provide the necessary power to the radio communication module 2 and the first RFID transceiver 4.

In an embodiment of the present invention, the first RFID transceiver 4 and the second RFID transceiver 8 are inductively coupled through a low-frequency EM field around 125 kHz, as shown in FIG. 7. In another embodiment of the present invention, the first RFID transceiver 4 and the second RFID transceiver 8 are inductively coupled through a high-frequency EM field around 13.56 MHz, as shown in FIG. 8. The power harnessed from the RFID reader 5 is stored and distributed from the power source 3. In the preferred embodiment of the present invention, the power source 3 is a fast-charging capacitor. The fast-charging capacitor allows the portable computing device 1 to be quickly charged and deliver the necessary power to the radio communication module 2 and the first RFID transceiver 4.

In some circumstances shown in FIG. 5, traditional RFID readers magnetically induce power on two separate frequencies. Those RFID readers modulate between one frequency, then pause, then modulate on the second magnetic frequency. In an alternate embodiment of the present invention, the portable computing device 1 may include two separate RFID transceivers: a first high-frequency RFID transceiver and a first low-frequency RFID transceiver. In addition, the RFID reader would be provided with a second high-frequency RFID transceiver and a second low-frequency RFID transceiver. The two separate transceivers harvest power on two separate frequencies, such as 125 kilohertz (kHz) and 13.56 Megahertz (MHz). This dual harvesting technique allows the portable computing device 1 to harvest power for Bluetooth radio communication, whereas the RFID reader 5 may have provided insufficient time on a single frequency to complete a Bluetooth transaction. Consequently, by harvesting power on both frequencies advantageously allows the portable computing device 1 to work in multi-frequency systems.

Figure 2:
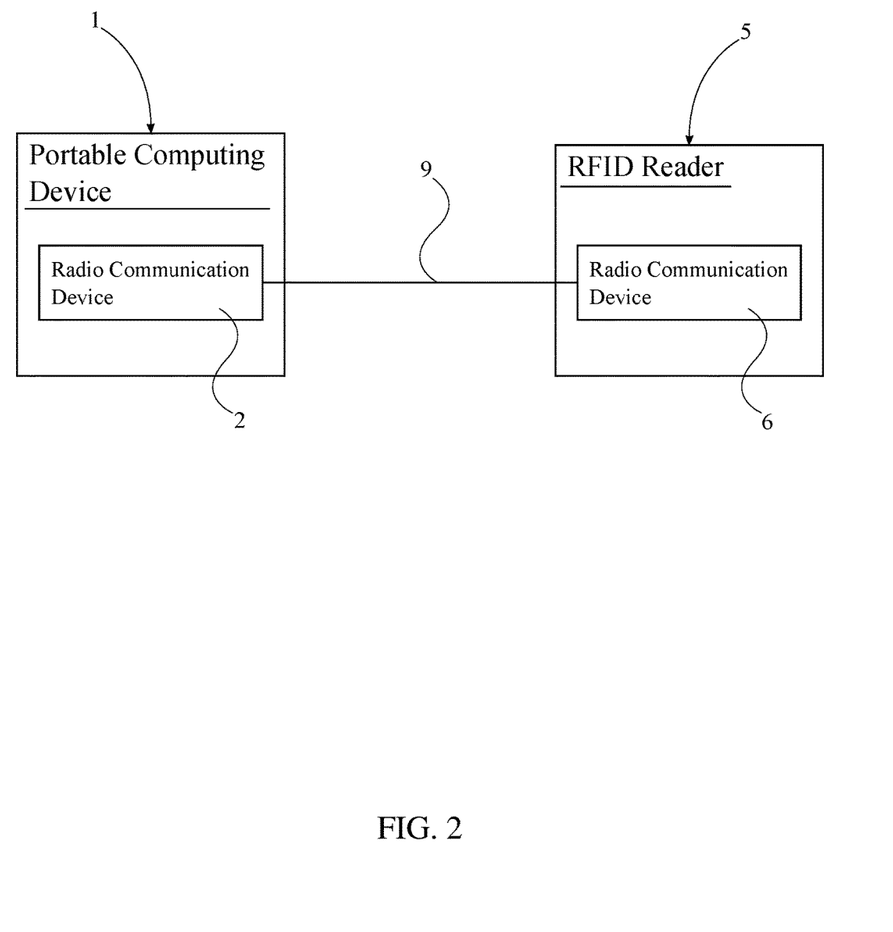
FIG. 2 is a schematic view for the system of the present invention, wherein the RFID reader is able to communicate with the portable computing device through the wireless personal network.
Figure 3:
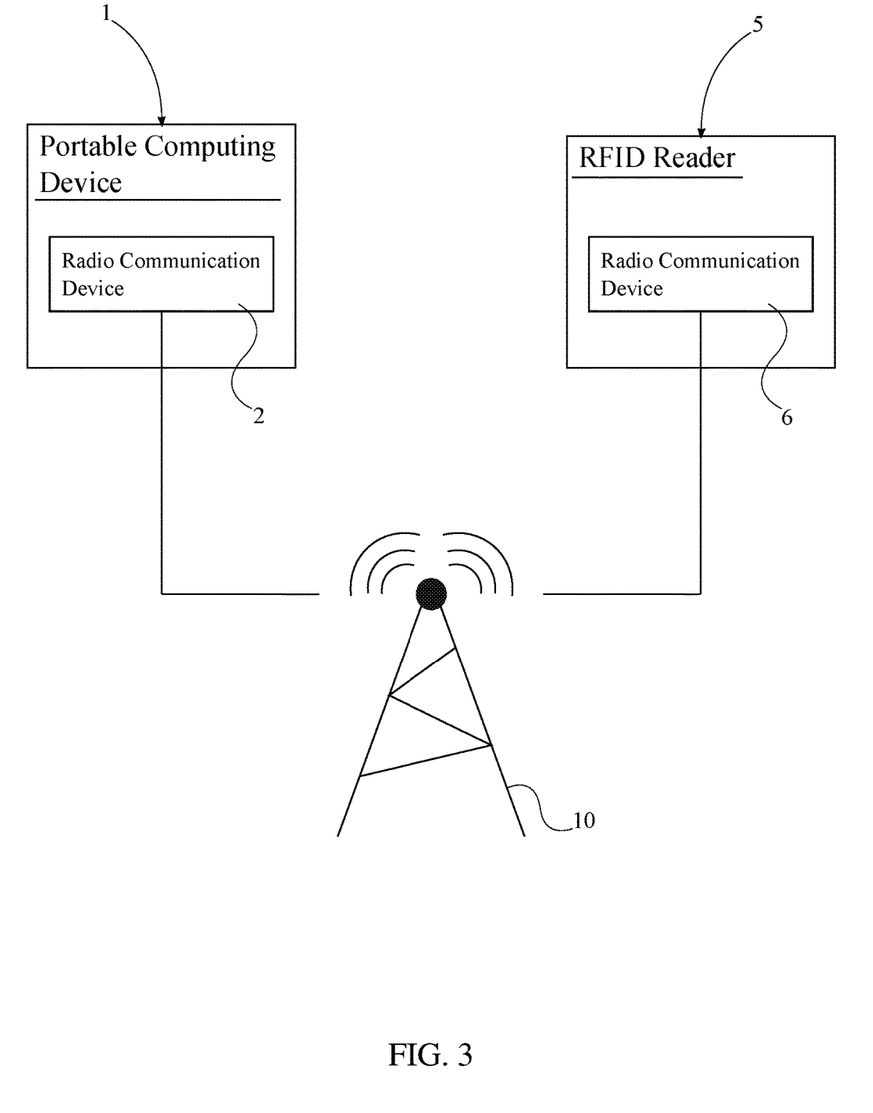
FIG. 3 is a schematic view for the system of the present invention, wherein the RFID reader is able to communicate with the portable computing device through the wireless local area network.
Figure 9:
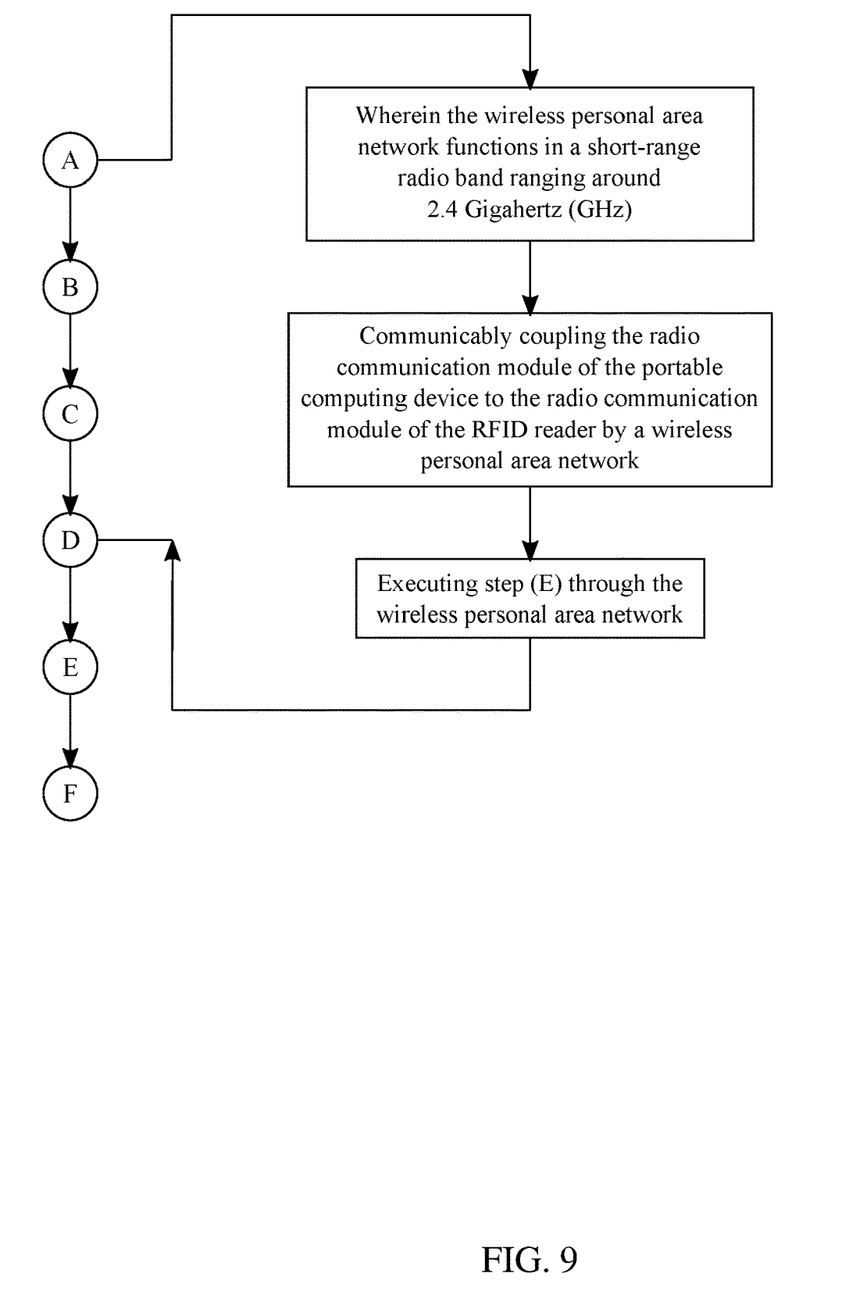
FIG. 9 is a flowchart illustrating the process of sending the set of user credentials over the wireless personal area network.
Figure 10:
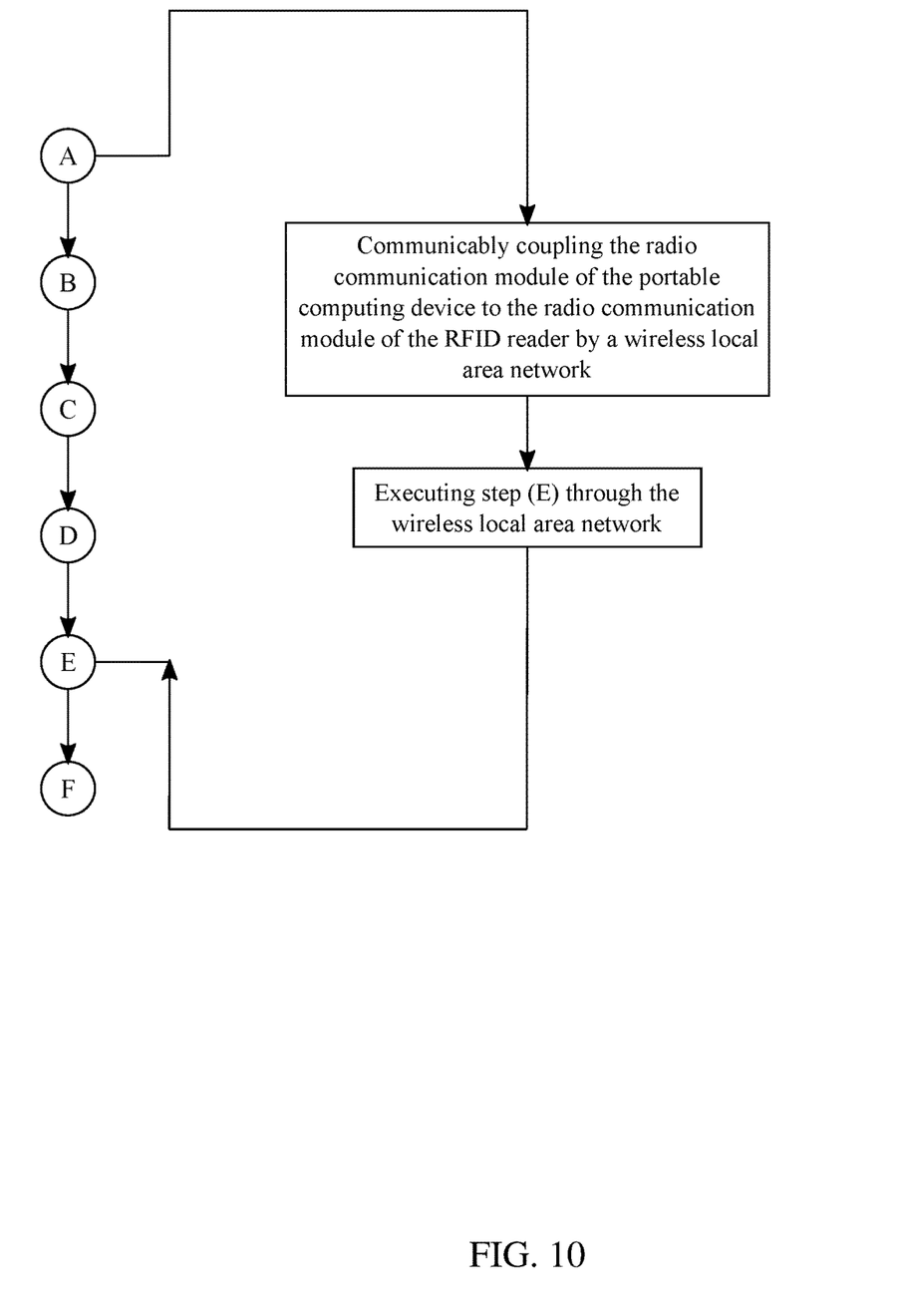
FIG. 10 is a flowchart illustrating the process of sending the set of user credentials over the wireless local network.

Once the portable computing device 1 has reached the minimum operating voltage, the set of user credentials is sent from the portable computing device 1 to the RFID reader 5. More specifically, the radio communication module 2 of the portable computing device 1 is communicably coupled to the radio communication module 6 of the RFID reader 5 by a personal wireless personal area network 9, illustrated in FIG. 2. The execution of Step E is implemented through the wireless personal area network 9, as seen in FIG. 9. The wireless personal network preferably functions in a radio band ranging around 2.4 Gigahertz (GHz) or 5.8 GHz. The set of user credentials may also be sent from the portable computing device 1 to the RFID reader 5 or other devices over Wi-Fi signals. The radio communication module 2 of the portable computing device 1 is communicably coupled to the radio communication module 6 of the RFID reader 5 or other separate radio communication device by a wireless local area network 10, as illustrated in FIG. 3. The execution of Step E is implemented through the wireless local area network 10, as seen in FIG. 10. The communication of the credentials from the portable computing device 1 may not always be to the RFID reader 5 that is supplying the power to the portable computing device 1.

Figure 11:
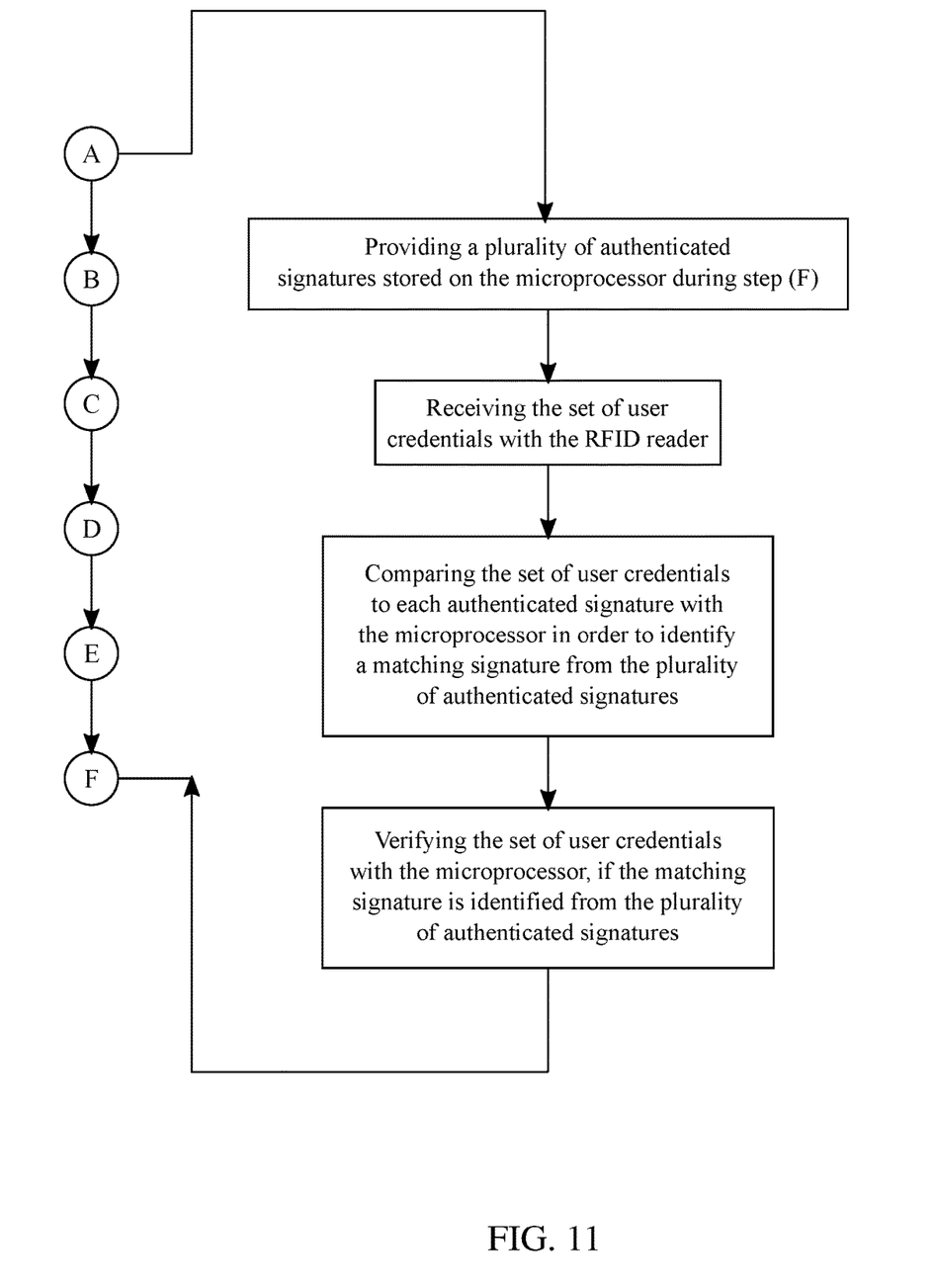
FIG. 11 is a flowchart illustrating the process of verifying the set of user credentials with the microprocessor.
Figure 12:
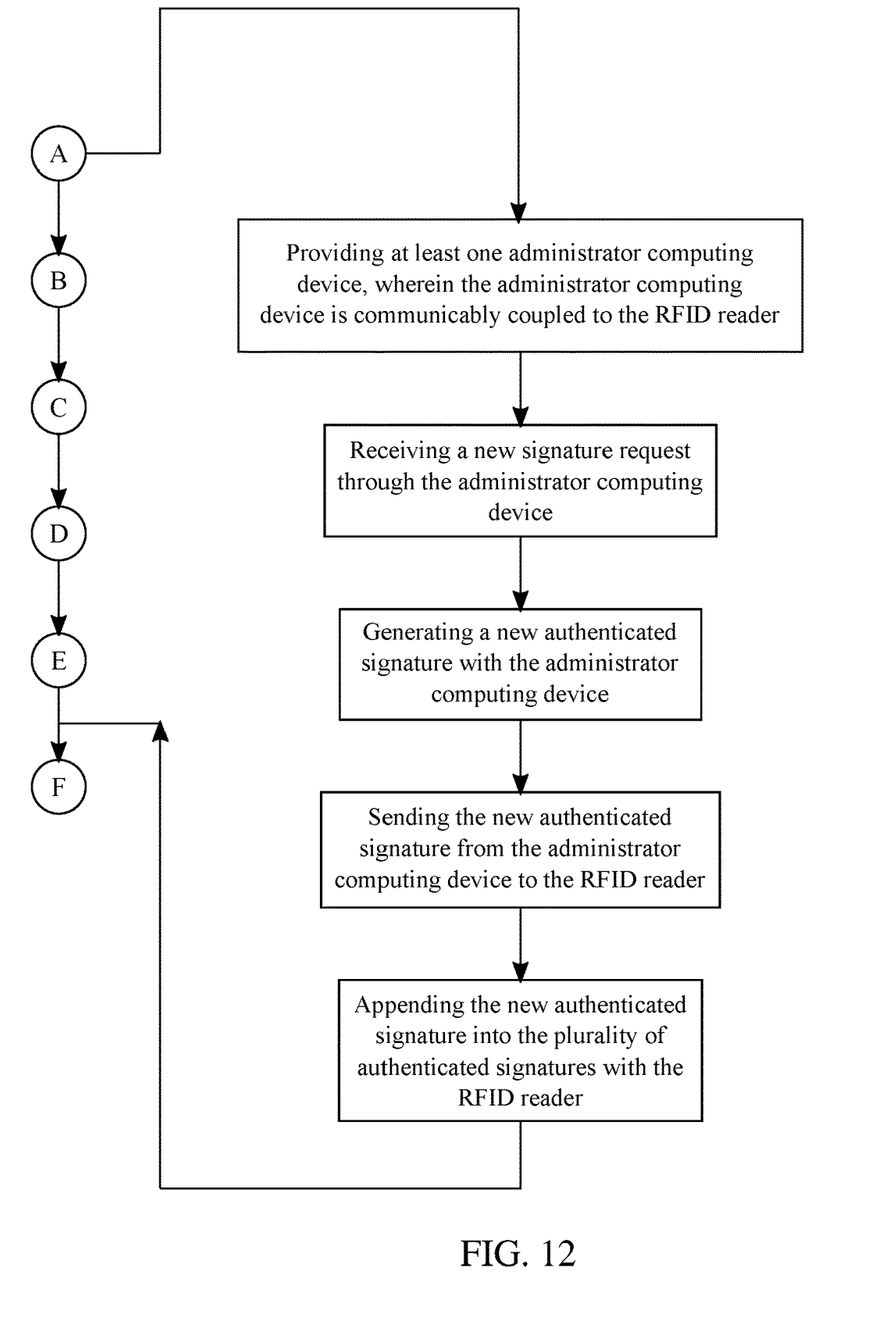
FIG. 12 is a flowchart illustrating the process of appending the new authenticated signature into the plurality of authenticated signatures.

In order to verify the set of user credentials stored on the portable computing device 1, the present invention further includes a plurality of authenticated signatures on the microprocessor 7 during Step F. This process is illustrated in FIG. 11. The plurality of authenticated signatures allows multiple portable computing devices to activate the door mechanism that corresponds to the RFID reader 5. The set of user credentials is received with the RFID reader 5. The set of user credentials is compared to each authenticated signature with the microprocessor 7 in order to identify a matching signature from the plurality of authenticated signatures. The set of user credentials is verified with the microprocessor 7, if the matching signature is identified from the plurality of authenticated signatures. In order to register a new set of user credentials with the RFID reader 5, the present invention further includes at least one administrator computing device 11. The at least one administrator computing device 11 is communicably coupled to the RFID reader 5 so that the new set of user credentials may be sent to and stored on the microprocessor 7. The process of registering a new set of user credentials, as shown in FIG. 12, begins with receiving a new signature request through the at least one administrator computing device 11. A new authenticated signature is generated with the at least one administrator computing device 11 so that the new authenticated signature is unique to the new set of user credentials. The new authenticated signature is sent from the at least one administrator computing device 11 to the RFID reader 5. The RFID reader 5 may now verify the new set of user credentials may act as the new authenticated signature is appended into the plurality of authenticated signatures with the RFID reader 5.

Moreover, in one embodiment, the portable computing device 1 may encrypt a traditional 26- to 96-bit card number (first card number) into a second card number, which is encrypted. The portable computing device 1 may communicate this second card number to an RFID reader over a wireless personal area network (e.g. Bluetooth) through either a low-frequency RFID or a high-frequency RFID. The RFID reader will send this encrypted card number onto the host device to which the RFID reader is attached too. The host device decrypts the second card number back into the first card number. This technique is advantageous as it allows unidirectional RFID door reader systems and symmetric key door reader systems to take advantage of end-to-end card number security without having to replace the RFID door reader or the wiring for the reader. Some important summarization points of this technique are: to have a portable computing device with any combination of low frequency RFID, high frequency RFID, or radio communication; the portable computing device harvests its energy from a low-frequency or a high-frequency RFID field; the portable computing device encrypts a first RFID card number into a second RFID card number; the portable computing device transmits the second RFID card number to the RFID reader; the RFID reader is unable to decrypt the second card number; and the RFID reader sends the second card number onto a host device to which the RFID reader is attached.

Although the invention has been explained in relation to its preferred embodiment, it is to be understood that many other possible modifications and variations can be made without departing from the spirit and scope of the invention as hereinafter claimed.

What is claimed is:

1. A method of communicating and authenticating credentials between a portable computing device and multiple radio frequency identification (RFID) enabled readers, the method comprising the steps of:

(A) providing a portable computing device with a first high-frequency RFID transceiver and a first low-frequency RFID transceiver, wherein the portable computing device includes both a radio communication module and a power source and communicates over Bluetooth and RFID frequencies;

(B) providing a RFID reader with a second high-frequency RFID transceiver and a second low-frequency RFID transceiver, wherein the RFID reader supports both Bluetooth and RFID communication and includes a radio communication module and a microprocessor;

(C) providing a set of user credentials stored on the portable computing device;

(D) inductively harvesting a quantity of electrical power into the power source by inductively coupling the first high-frequency RFID transceiver to the second high-frequency RFID transceiver, and inductively coupling the first low-frequency RFID transceiver to the second low-frequency RFID transceiver, when the portable computing device is positioned proximal to the RFID reader;

(E) sending the set of user credentials from the radio communication module of the portable computing device to the radio communication module of the RFID reader, when the quantity of electrical power is inductively harvested from the RFID reader to the power source; and (F) executing an authentication process for the set of user credentials with the microprocessor; and, when the user credentials are authenticated, appending the set of user credentials as a new authenticated signature to a plurality of authenticated signatures stored on the microprocessor for access to a restricted area.

2. The method of communicating and authenticating credentials between a portable computing device and multiple RFID enabled readers, the method as claimed in claim 1 comprises the steps of:

converting a quantity of electromagnetic (EM) field energy from the second high-frequency RFID transceiver into a quantity of EM potential energy at the first high-frequency RFID transceiver;

converting a quantity of electromagnetic (EM) field energy from the second low-frequency RFID transceiver into a quantity of EM potential energy at the first low-frequency RFID transceiver; and, storing the quantity of EM potential energy with the power source.

3. The method as claimed in claim 2, further comprising: wherein the first high-frequency RFID transceiver and second high-frequency RFID transceiver are inductively coupled through a high-frequency EM field of 13.56 Megahertz (MHz).

4. The method as claimed in claim 2, further comprising: wherein the first low-frequency RFID transceiver and second low-frequency RFID transceiver are inductively coupled through a low-frequency EM field of 125 kilohertz (kHz).

5. The method as claimed in claim 1, further comprising: communicably coupling the radio communication module of the portable computing device to the radio communication module of the RFID reader by a wireless personal area network; and, executing step (E) through the wireless personal area network.

6. The method as claimed in claim 5, further comprising: wherein the wireless personal area network functions in a short-range radio band ranging around 2.4 Gigahertz (GHz) or 5.8 GHz.

7. The method of claim 1, further comprising the steps of: communicably coupling the radio communication module of the portable computing device to the radio communication module of the RFID reader by a wireless local area network; and, executing step (E) through the wireless local area network.

8. The method of claim 1, further comprising the steps of providing a gateway between mobile devices and traditional RFID enabled readers by:

providing the plurality of authenticated signatures stored on the microprocessor during step (F);

receiving the set of user credentials with the RFID reader;

comparing the set of user credentials to each authenticated signature from the plurality of authenticated signatures with the microprocessor in order to identify a matching signature from the plurality of authenticated signatures; and, verifying the set of user credentials with the microprocessor, when the matching signature is identified from the plurality of authenticated signatures.

9. The method of as claimed in claim 8, wherein the step of providing the gateway between mobile devices and traditional RFID enabled readers further includes:

providing at least one administrator computing device, wherein the at least one administrator computing device is communicably coupled to the RFID reader;

receiving a new signature request through the at least one administrator computing device;

generating an additional new authenticated signature with the at least one administrator computing device;

sending the additional new authenticated signature from the at least one administrator computing device to the RFID reader; and, appending the additional new authenticated signature into the plurality of authenticated signatures with the RFID reader.

* * * * *